United States Patent [19]

Murad

[11] 4,317,071
[45] Feb. 23, 1982

[54] COMPUTERIZED ILLUMINATION SYSTEM

[76] Inventor: Peter S. E. Murad, 16183 Caribou St., Fountain Valley, Calif. 92708

[21] Appl. No.: 957,216

[22] Filed: Nov. 2, 1978

[51] Int. Cl.³ .................... H05B 37/02; H05B 39/08
[52] U.S. Cl. .................................. 315/312; 315/293; 315/323
[58] Field of Search ............... 315/194, 199, 291, 312, 315/313, 323, 293

[56] References Cited

U.S. PATENT DOCUMENTS 4,037,135  7/1977  Novey ................................. 315/194
4,071,809  1/1978  Weiss et al. ......................... 315/312

OTHER PUBLICATIONS

Bean, *Chromachase 4*, Practical Wireless, Dec. 1976, pp. 676-681.
*Disco Lights*, Elector, Sep. 1975, pp. 924-926.

Primary Examiner—Eugene R. LaRoche

[57] ABSTRACT

The invention consists mainly of two major sub-systems, ie, three colored lamps and a solid state digital computer. The three lamp colors are green, blue and red. The Computer consists of several TTL devices, diodes, capacitors and resistors. The computer electronics generate the trigger pulses for controlling the firing of triacs which are power devices controlling the amount of power delivered to the lamps. Each lamp is driven by one triac. However, each triac has the power capability to drive several lamps. These lamps generally are immersed in water but could also be used out of water.

8 Claims, 5 Drawing Figures

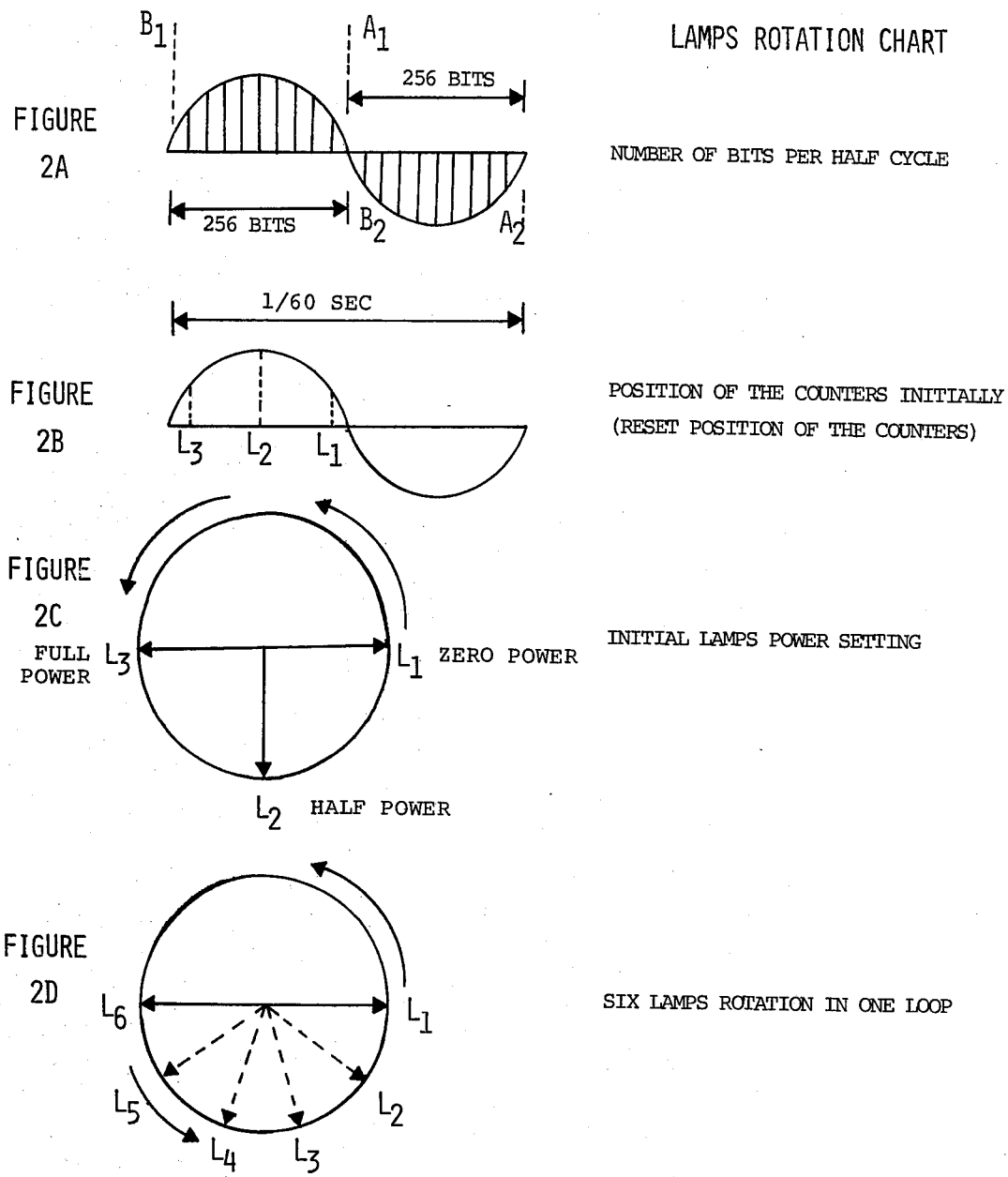

COMPUTERIZED ILLUMINATION SYSTEM

The invention can provide any water pool, fountain, outdoor play area or theatrical stage with a kaleidoscope of color. The main purpose of this system is for public entertainment.

BACKGROUND OF THE INVENTION

The present state of the art in lighting pools, fountains and theatrical stages consists of fixed intensity lighting and in select cases the capability to switch from fully on to fully off. The invention, known commercially as SPECTROMATIC, advances the state of the art in lighting by providing for changing the intensity of the light sinusoidally and simultaneously mixing several color frequencies to generate new colors continuously. The speed of continuous light rotation can be changed from one cycle per several minutes to as fast as one cycle per one second or less. This complete cycle of color rotation will generate most of the frequencies in the visible spectrum to which the eye is sensitive. The system provides a switch control to stop the rotation of these colors during any time of the cycle rotation. The third feature of SPECTROMATIC is to maintain the three colors at any level in intensity from minimum power to maximum, depending on the programming of the computer. The fourth feature provides the capability to program the light intensity to be sensitive to music. In this mode, SPECTROMATIC is programmed to start from zero light intensity, when the music is off, and increase in intensity sinusoidally depending on the loudness of the music. Mono sound can drive the lighting of a three color loop. When using six or more lamps in one rotation loop, each set of colors can be driven by one channel of stereo music.

The invention has been built and tested. The first breadboard system consisted of TTL devices and passive circuit elements such as resistors, capacitors and diodes. This integrated circuit was mounted on vector board 4"×6" and the pins were wirewrapped. Two of these systems were originally built which enabled rotating three and six lamps in one loop. Many tests were conducted on this computer and on the actual lights immersed in a pool to show their feasibility and to improve the operation of the system.

The second version was changed utilizing printed board triacs to drive the lamps and pulse transformers to trigger the triacs. Many tests were performed on this brassboard system both in the laboratory and in the field where actual lamps were driven by the computer while they were immersed in water. One of the systems was installed in a pool and has been operating continuously and successfully since May 1978. It has proved very reliable and successfully exhibits all the capabilities as discussed herein. The present production version uses a double sided copper clad printed board with optical couplers to drive the triacs. Several sample production systems were built, tested and proven very successful.

BRIEF DESCRIPTION OF THE DRAWING

FIGS. 2A-2D illustrate operational relationships and features of the invention.

DETAILED DESCRIPTION OF THE INVENTION

Figure 1:
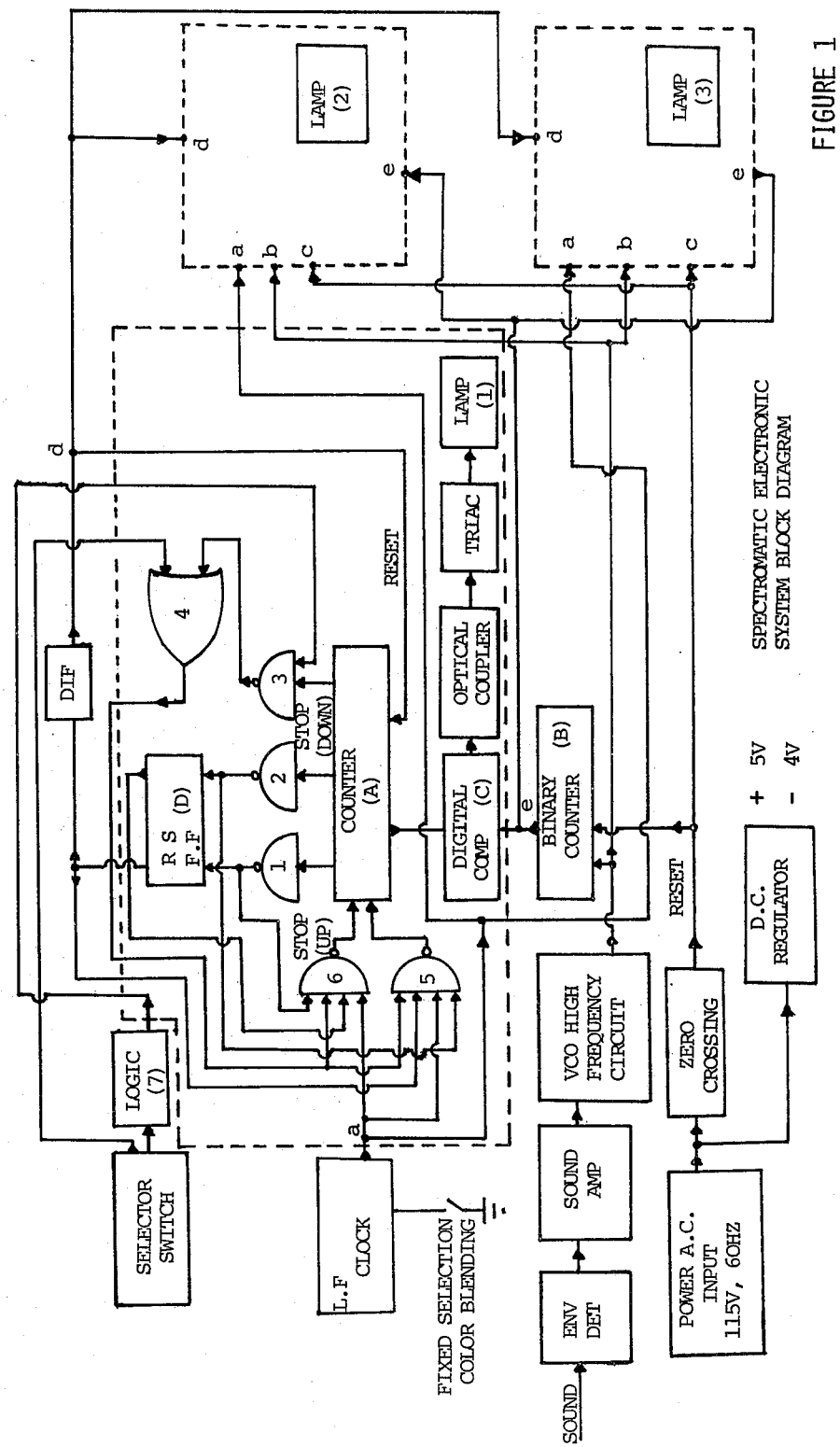
FIG. 1 is a block diagram of the system of the invention.

The system can allow for three or more lamps to be placed in a loop with a fixed electrical angle separation among them. Their output is then varied sinusoidally. For example, the three lamps, initial phasing is illustrated in FIG. 2B. This is one of the situations where there are three lamps $L_1$, $L_2$ and $L_3$ in a loop. At the beginning of the cycle, the output intensities of these lamps are illustrated in FIG. 2C. Each of these lamps is initially preset by setting counter "A" in FIG. 1 to a certain binary position which designates its initial position output in the loop. Each one of these lamps has a counter, e.g. counter "A" in FIG. 1. The binary information in counter "A" can be shifted up or down to move the position of the lamp in the loop, hence changing its intensity.

One of the lamp circuits acts as a master to synchronize the position of the other lamps to a specific point in the 60 cycle power frequency. As shown in FIG. 1, when Flip-Flop D is triggered into its reset state, differentiator DIF passes a pulse on line d to each counter A to reset each counter A to the initial setting. Counter "A" moves up or down between two limits determined by NAND GATES 1 and 2. When counter "A" counts up to a certain limit, the output of NAND GATE 1 will trigger Flip Flop D and shut off NAND GATE 6. This enables NAND GATE 5 and NAND GATE 2 to stop counter "A" from moving up. The low frequency clock oscillator shifts counter "A" up or down depending on the state of Flip-Flop D. The speed of the low frequency clock will determine the period of one cycle rotation of counter "A". This period is also equal to one cycle of lamp rotation. Therefore, changing the frequency of the low frequency oscillator will change the period of the lamp rotation. Counter "A" consists of 8 Flip-Flops which have the capability of counting 256 Bits either up or down. When the light rotates, the high frequency oscillator remains at fixed frequency equivalent to 30.72 KH$_z$. The total period of 256 pulses of the high frequency oscillator is equivalent to half the cycle period of the 6 OH$_z$ line supply, FIG. 2A. Therefore, for each half cycle of the power line, counter "B" counts approximately 256 Bits. When the binary number of counter "A" matches the binary number of Counter "B" a positive pulse is produced from the digital comparator C which determines the firing position of the triac. The triac drops out after the reversal of the power supply frequency polarity and triggers on the second half of the supply cycle. FIG. 2D illustrates six lamps in one loop with constant and equal phasing between each adjacent lamp.

Fixed blending can be achieved when the high frequency oscillator has a constant frequency of 30.72 KH$_z$. Stopping the low frequency oscillator from producing pulses causes counter "A" to remain at fixed binary count thus stopping the rotation of the light and maintaining the light intensity fixed, depending on the count of counter "A". The low frequency oscillator is stopped by bringing one of its terminals to ground through the fixed selection color blending switch as indicated in FIG. 1.

This computer can be programmed to determine the lamp firing position which corresponds to the amplitude of the sound envelope frequency. OR GATE 4 is enabled by both the selector switch and the NAND GATE 3 to stop counter "A" from counting and to maintain the binary number in counter "A" at low lamp intensity. When there is no sound, the firing point of the triac trigger is at the zero power of the cycle and the lamps remain in a low power output. The sound varies the frequency of the high frequency oscillator depending on its amplitude. The higher the sound amplitude, the higher the frequency of the high frequency oscillator. Hence, counters "A" and "B" will be matched prior to the zero crossing of the power supply and thereby increase the lamp intensity output. The sound signal is fed to an envelope signal detector, clipping the negative part of the signal and passing only the positive part. The output of this circuit passes through an inverter amplifier which changes the time constant of the high frequency oscillator hence changing its frequency output. A potentiometer is provided to control the gain of the sound loop.

The computer can be programmed to stop the rotation of the lamps at any position and maintain them at the same intensity level. This is performed by NAND GATE 3 and OR GATE 4 and the selector switch. The difference between this mode of operation and the sound modulation results from shifting one of the input signals of GATE 3 from the binary number of the most significant bit of the eighth counter "A" to prime number, hence shifting the position of NAND GATE 3 in the 6 $OH_z$ line supply by 128 bits from the zero crossing. Thus, the match between counter "A" and "B" will occur near half of the 6 $OH_z$ supply voltage and trigger the triac to produce half power output.

The circuitry of the SPECTROMATIC computer system can be easily deposited on one chip in a monolithic form and be produced very inexpensively in large quantities and in a very small package.

I claim:

1. An illumination control system for a plurality of lamps and optical elements arranged to emit at least three different colors of lights, comprising:
   a high frequency clock; a first binary counter connected to the output of the high frequency clock; a low frequency clock; and, a plurality of electronic control circuits, each individual control circuit controlling the emission of one color of light, each control circuit comprising a second binary counter connected to the output of the low frequency clock, a digital comparator for comparing the counts in the first and second binary counters, and means for controlling the intensity of the emission of said one color of light in response to the output of said comparator.

2. An illumination control system as recited in claim 1 wherein the colors of light are red, green, and blue, said lamps and optical elements are immersed in a scattering medium, and said electronic control circuits include means for independently varying the power to the lamps, whereby multiple colors in a selectively fixed and cycling pattern are generated.

3. An illumination control system as recited in claim 1 wherein said second binary counters are up-down counters, each counter being programmable to establish a preset initial intensity level in its associated lamp and to establish direction of count, said counters stepping one binary number in the established direction for each clock pulse received, said counters automatically reversing in count upon obtaining either established minimum or maximum counts.

4. An illumination control system as recited in claim 3 wherein one of said up-down counters is a master counter, and said illumination control system further includes means responsive to the re-setting of said master counter for resetting all other counters.

5. An illumination control system as recited in claim 1 wherein the second binary counter is an up-down counter triggered by the low frequency clock, the period of said low frequency clock is manually controllable, whereby the counter triggers and hence lamp intensity cycle is controllable, and, said electronic control circuit includes means for inhibiting the clock from triggering the up-down counter, whereby a constant lamp intensity is produced corresponding to the time at which the clock is inhibited.

6. An illumination control system as recited in claim 1 wherein said digital comparator generates a lamp trigger pulse when the count in the first binary counter is identical to the count in the up-down counter.

7. An illumination control system as recited in claim 1 wherein a control system is provided such that when its position is selected, each up-down counter will stop upon obtaining maximum count at which point the low frequency clock is inhibited and said lamp intensity is zero.

8. An illumination control system as recited in claim 7 wherein said high frequency clock includes a voltage control oscillator, said illumination control system further including means effective upon selection to said control position for enabling the introduction of audio signals to said voltage control oscillator to frequency modulate said high frequency clock, said modulation causing equal linear intensity variations of the three colors.

* * * * *